Oct. 25, 1966
J. HANUS
3,280,877
PNEUMATIC TIRES
Filed Nov. 9, 1964
4 Sheets-Sheet 1
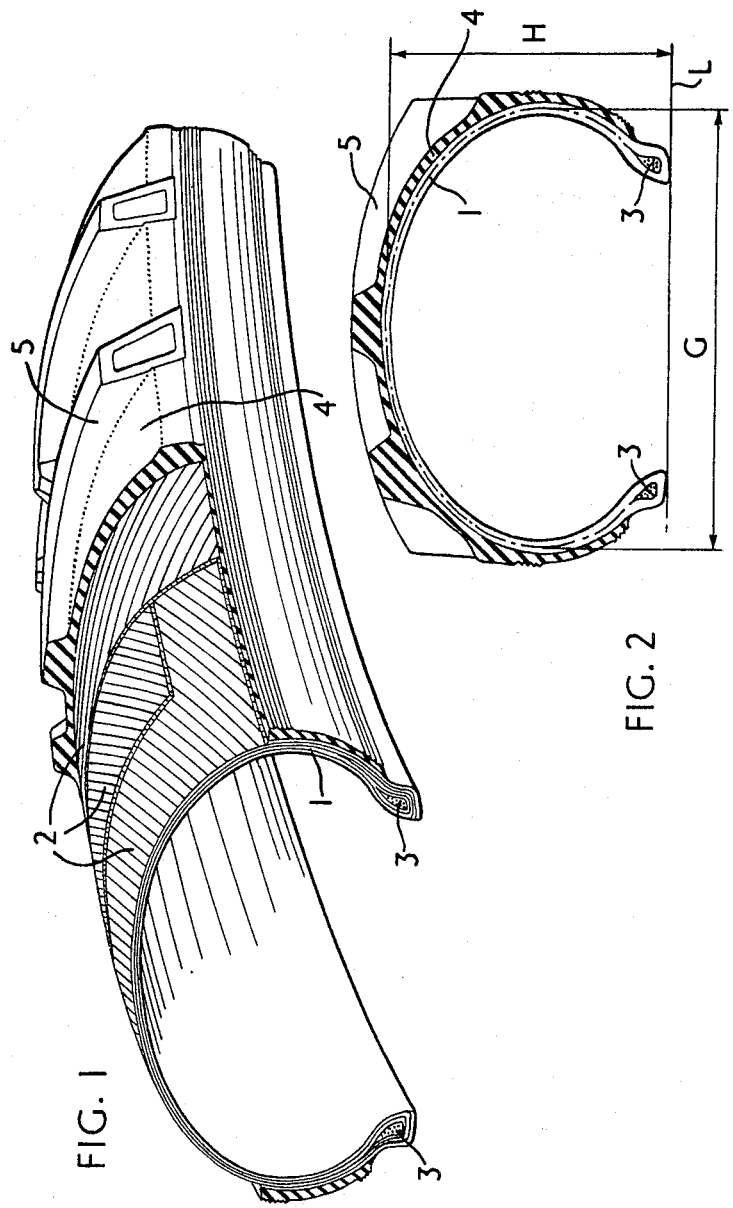
Inventor:
Jean Hanus
by Benj. T. Rauber
attorney

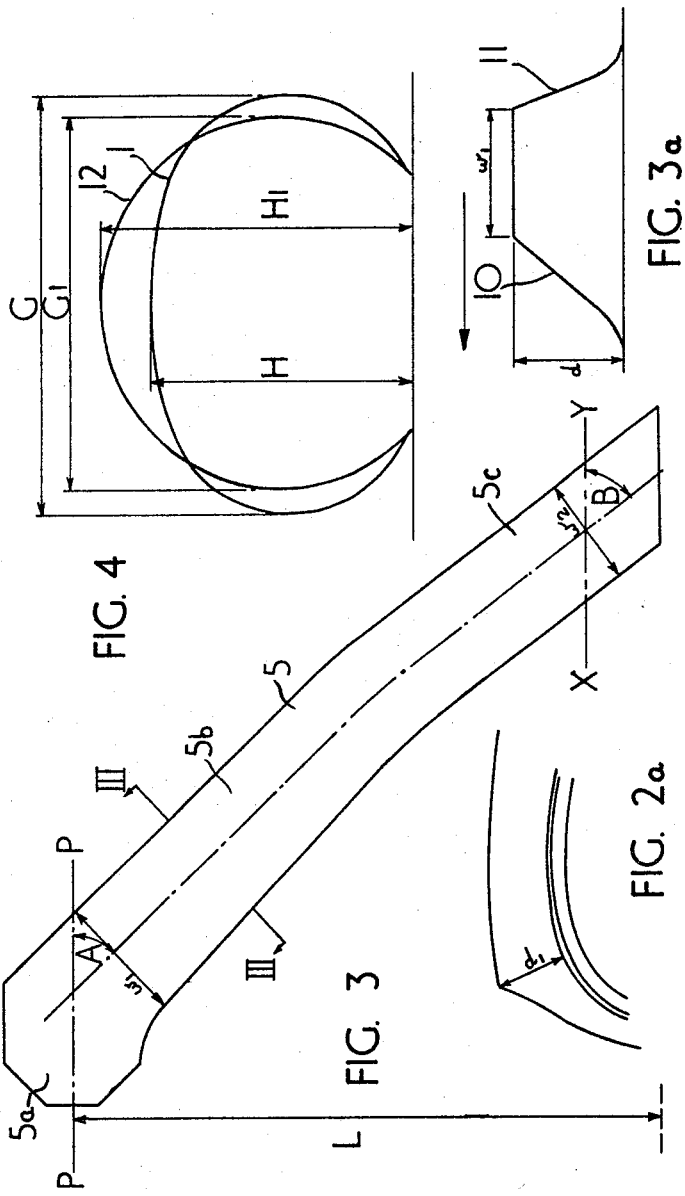

Oct. 25, 1966    J. HANUS    3,280,877
PNEUMATIC TIRES
Filed Nov. 9, 1964    4 Sheets-Sheet 3

Oct. 25, 1966  J. HANUS  3,280,877
PNEUMATIC TIRES

Filed Nov. 9, 1964  4 Sheets-Sheet 4

United States Patent Office 3,280,877
Patented Oct. 25, 1966

3,280,877
PNEUMATIC TIRES
Jean Hanus, Montlucon, Allier, France, assignor to Dunlop Rubber Company Limited, London, England, a British company
Filed Nov. 9, 1964, Ser. No. 409,827
Claims priority, application France, Nov. 12, 1963, 953,316
11 Claims. (Cl. 152—354)

This invention relates to pneumatic tires.

According to the invention a pneumatic tire incorporates a tread comprising a plurality of ground-contacting lugs and a carcass reinforcement comprising a plurality of layers of reinforcing cords, the cords in each of the layers extending across the crown region in a direction lying at a maximum angle of 33° to the midcircumferential plane of the tire, and in the moulded uninflated tire shape, the carcass reinforcement having a maximum mean height, to a maximum mean width ratio lying within a range between .5 and .75.

In the preceding paragraph and as referred to later in the specification, it is intended that the maximum mean height and width are related to a mean line of the carcass reinforcement which extends from bead region to bead region of the reinforcement and which lies midway between inner and outer surfaces of the reinforcement, measured in a cross-section of the tire containing its rotational axis the maximum mean height being measured from the bead base of the tire to the radially outermost point of the mean line at the crown of the tire, and the maximum mean width being measured between the two points of the mean line which lie at the greatest axial distance apart.

Preferably, the cords in each layer of the carcass reinforcement extend in a direction at an angle of between 27° to 33° to said plane.

Preferably also, the carcass reinforcement has a maximum mean height to maximum mean width ratio lying within the range from .6 to .7.

It is also preferable that in a cross-section of the tire normal to said plane and in the moulded uninflated tire shape, the radius of curvature of the carcass reinforcement in the crown region of the tire is greater than the maximum mean height of the reinforcement.

It is further preferred that each ground-contacting lug of the tread extends across the tread at an angle of between 45° and 55° to the midcircumferential plane of the tire. Each lug may extend from the midcircumferential plane towards a sidewall region of the tire with adjacent lugs extending to opposite sidewall regions, and adjacent lugs may extend in directions of opposite sense with respect to said plane. Alternatively, the lugs may be arranged in echelon or in chevron formation.

One embodiment of the invention will now be described, by way of example, with reference to the accompanying drawings in which:

FIGURE 1 is a perspective view of a tractor tire according to the invention, the tire being sectioned in a stepped manner;

FIGURE 2 is a cross-sectional view, in a direction normal to the midcircumferential plane, of the tire shown in FIGURE 1;

FIGURE 2a is a cross-sectional view of a portion of the tire;

FIGURE 3 is a plan view of a tread lug of the tire;

FIGURE 3a is a cross-sectional view of the tread lug of FIGURE 3 along line III—III of FIGURE 3.

FIGURE 4 shows diagrammatically the superimposed moulded shape of a carcass reinforcement of the tire shown in the above figures and of a tire of conventional cross-section.

Figure 5:
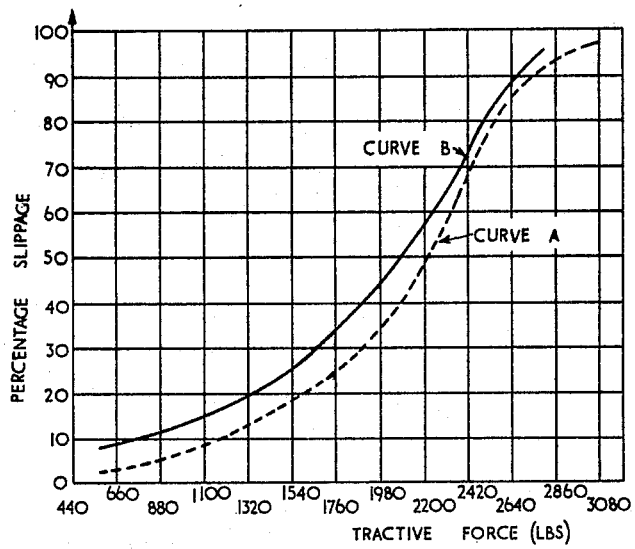
FIGURES 5 and 6 are graphical representations which show, respectively, the percentage slippage and the fuel consumption as a function of tractive force for the tire shown in the above figures and for a conventional tire of similar size.

As shown in FIGURE 1, a pneumatic tractor tire comprises a carcass reinforcement 1 incorporating four layers 2 of rubberised parallel cords which extend from one bead region to the other. The two radially innermost layers of cords have their ends turned radially outwardly around bead wires 3, while the ends of the two radially outermost layers terminate in the toe regions of the bead bases. In each layer, the cords extend across the crown region of the tire at an angle of 27° to the midcircumferential plane of the tire and the directions of the cords in adjacent layers are of opposite sense with respect to said plane.

In the molded uninflated shape of the tire, the diameter of the bead base region is approximately 28″ and the maximum mean height H of the reinforcement (see FIGURE 2) measured from the bead base to the crown region of the tire is 6.6″, whereas the maximum mean width G of the reinforcement is 11″, so that the height to width ratio is .6. In addition, the radius of curvature of the carcass reinforcement in the crown region of the tire in its molded uninflated shape is greater than the maximum mean height of the reinforcement.

The carcass is surmounted by a rubber tread layer 4 which comprises a plurality of ground-contacting lugs 5 each of which extends from the midcircumferential plane of the tire towards a tire sidewall region at an angle of less than 90° to said plane as will be described, adjacent lugs extending towards opposite sidewall regions of the tire and extending in a direction of opposite sense with respect to said plane. Each lug has a length which is between .45 and .50 of the maximum mean width G of the reinforcement 1.

As shown in FIGURE 3, each lug 5 has an axially inner end 5a which lies astride the midcircumferential plane (represented in FIGURE 3 by line P—P). A portion 5b of the lug 5 extends towards the shoulder region from the axially inner end 5a, at an angle A of 45° to the midcircumferential plane. Another portion 5c of the lug, which forms an axially outward extension of the portion 5b, extends at an angle B of 50° to a circumferentially extending line, e.g. line XY, crossing the portion 5c.

As shown in FIGURES 3 and 3a, the ground-contacting surface of the portion 5b of the lug decreases progressively in width from a width $W_1$ at its axially inner end to a width of $W_2$ at the axially outer end, the portion 5c having a constant width, $W_2$.

The volume and dimensions (in particular the width) of the lugs is dependent mainly on the size of the tire. For instance, in each lug the ratio of $W_1/G$ lies between .09 and .13. In the construction being described in which $G=11″$, the width $W_2$ is 1.2 inches.

Further, the ratio of the width $W_2$ to maximum mean width G of the carcass reinforcement lies between .07 and .115.

In addition, the value of $d/G$ lies within the range between .09 and .14 at the central crown region of the tire, where $d$ is the height of each lug from the ground contacting surface to the base of an adjacent tread groove as shown in FIGURE 3a. In the shoulder regions of the tire, the ratio of $d_1/G$ lies within the range from .13 to .18 where $d_1$ is the height of the tread lug in the shoulder regions as shown in FIGURE 2a.

Furthermore, the side 10 of each lug which faces the direction of rotation of the tire (illustrated by the arrow in FIGURE 3a), extends radially inwardly at an angle between 15° and 25° to a radially extending line of the tire crossing the side. The side 11 of each lug which lags in the sense of the direction of rotation, extends radially inwardly at an angle between 5° and 15° to a radial line crossing the side.

To determine the characteristics of the tire described above, tests have been made on the tire described above and also on a conventional tractor tire of approximately equal bead diameter and manufactured to support similar loads to those for which the tire described above is designed to support.

The conventional tire is of similar construction to the tire described above except that conventional tire comprises a carcass reinforcement of four rubberized cord layers, the cords of which extend across the crown region of the tire at an angle of 40° to the midcircumferential plane, and the ratio of the maximum mean height $H_1$ to the maximum mean width $G_1$ of the conventional tire carcass reinforcement in its molded uninflated shape is approximately .85. FIGURE 4 shows a comparison between the molded uninflated shapes of the carcass reinforcement 1 of the tire described above and the reinforcement 12 of the conventional tire.

The tests were as follows:

*Test 1.*—In this test, the tire according to the invention was fitted to a 10 inch wide rim and submitted to a constant load of approximately 16 cwt. The degree of compression and the area of contact between the tread of the tire and the ground was measured for four different inflation pressures of the tire. The conventional tire was then subjected to a substantially equal load, and corresponding measurements were obtained for this tire for inflation pressures which were substantially equal to the four pressures under which the tire according to the invention was tested.

The results of this test are as follows:

TABLE I

| Load (cwt.) | Tire according to invention | | Conventional tire | |
|---|---|---|---|---|
| | 1 | 2 | 3 | 4 | 5 |
| 16.7 | 8.5 | 1.9 | 36.8 | 2.2 | 35.5 |
| 16.7 | 11.5 | 1.7 | 33.5 | 2.0 | 32.8 |
| 16.7 | 12.7 | 1.6 | 32.7 | 1.9 | 31.5 |
| 16.7 | 15.5 | 1.4 | 30.0 | 1.7 | 29.1 |

In the above Table I, column 1 is tire inflation pressure (lbs./square inch), columns 2 and 4 are, respectively, compression in inches of the tire according to the invention and of a conventional tire for the inflation pressures in column 1, and columns 3 and 5 are, respectively, the contact area in inches of the tire according to the invention and of the conventional tire for the inflation pressures in column 1.

TABLE II
[Tires mounted on same rim size]

| Tire | Load (cwt.) | Inflation Pressure (lbs./inch²) | Yield under Compression Percent of H |
|---|---|---|---|
| Conventional | 16.7 | 11.5 | 24.3 |
| According to the invention | 16.7 | 8.5 | 24.5 |

It can be seen that when subjected to an inflationary pressure of 8.5 pounds per square inch, the part of the crown region of the tire described above which contacts the ground is compressed radially inwardly under load for a distance of 1.9 inches and the tread lugs contact the ground over an area of 36.8 square inches. In comparison under a similar load, the crown region of the conventional tire which contacts the ground is compressed radially inwardly a distance of 2.2 inches and the tread lugs of this tire contact the ground over an area of 35.5 square inches.

It is apparent upon consideration of Table I, that to reduce the amount of compression of the conventional tire to 1.9 inches, it is necessary to subject the conventional tire to an inflationary pressure of 12.7 pounds per square inch. This increase in pressure however, has the disadvantage that it is accompanied by a decrease in the ground contacting area of the tread lugs of the tire to 31.5 square inches.

It is apparent therefore that under substantially equal inflationary pressures, the tire according to the invention has greater stability because of its contact with the ground than the conventional tire. Further, it is apparent that the inflationary pressure within the tire according to the invention may be below that within the conventional tire while the tire according to the invention is subjected to a degree of compression in its crown region which is no greater than that subjected to the conventional tire. This is borne out by comparing the degree of compression of the tire according to the invention for an inflationary pressure of 8.5 pounds per square inch and of the conventional tire for an inflationary pressure of 12.7 lbs./inch² and also by comparing the percentage compression of the two tires for different inflationary pressures as detailed under Table II. It follows therefore, that the tire according to the invention may be subjected to lower inflationary pressures than the conventional tire before the degree of compression of its crown region has a detrimental effect upon the tire e.g., by causing the sidewalls to be forced outwardly to such an extent that sidewall cracking occurs.

Compression of the crown region of the tire according to the invention is at least partially resisted by the cords in the carcass reinforcement which, because they lie at an angle of 27° to the midcircumferential plane in the crown region, serve to stiffen the sidewalls to resist buckling under load. With the conventional tire which has a relatively higher cord angle, the sidewalls are less stiff than the tire according to the invention and therefore resist buckling to a lesser extent.

*Test 2.*—In this test, two tires according to the invention having inflationary pressures of 8.5 lbs./inch² were fitted to a tractor and subjected to a load of 16.7 cwt. as specified in Table II above, and the tractor was driven over a predetermined distance along the ground while subjecting the wheels to a constant torque in known manner, and the number of revolutions of the tires, over this distance were noted. The theoretical possible revolutions of each tire over the predetermined distance if no slippage of the tire had occurred were then subtracted from the actual number of revolutions, and this result was then determined as a percentage of the actual number of revolutions to establish the percentage slip of the tire on the ground. The percentage slip was then obtained in a similar manner while subjecting the wheels to different constant torques. As shown in FIGURE 5, the percentage slip of one tire according to the invention over a range of vehicle speeds is represented graphically by curve A as a function of the tractive force in pounds.

The percentage slip of two conventional tires was then determined over the same predetermined distance and over the same portion of the ground for a range of constant torques, the tires having inflationary pressures of 11.5 lbs./inch². The percentage slip of one of these tires was then represented as a function of the tractive force as shown by curve B of FIGURE 5.

It is apparent from a comparison of these two curves that under an equal tractive force, the percentage slip of the tire, according to the invention is less than that of the conventional tire, and that in a case where the percentage slip of the two tires are equal, the tractive force of the tire according to the invention is greater than that of the conventional tire. From this test therefore it is obvious that the tire according to the invention has a greater slip resistance than the conventional tire. It was observed during this test that the maximum tractive force produced by a vehicle fitted with tires according to the invention was approximately 3000 lbs. whereas the vehicle fitted with the conventional tires had a maximum tractive force of approximately 2800 lbs.

It is also noted that at the lower value constant torques, then for the tire according to the invention to have a percentage slip equal to that of the conventional tire, the tractive force produced by the vehicle was of the order of 20% greater than with the use of conventional tires.

The tractive force of the tire according to the invention was greater than the conventional tire because of the greater contact area which the tire according to the invention had with the ground (see Test 1 above).

*Test 3.*—In this test, two tires according to the invention subjected to the same inflationary conditions and load as in Test 2 were fitted to a tractor. The tractor was then driven for a period of 14 minutes while subjecting the wheels to a constant torque, and at the end of this period, the percentage slip of each tire was calculated over the distance that the tractor had travelled, and the fuel consumption of the tractor was noted. The percentage slip and fuel consumption were then determined in similar manner while subjecting the tires to different constant torque values. Curve C of FIGURE 6 illustrates the fuel consumption of the tractor as a function of the tractive force during this test.

Figure 6:
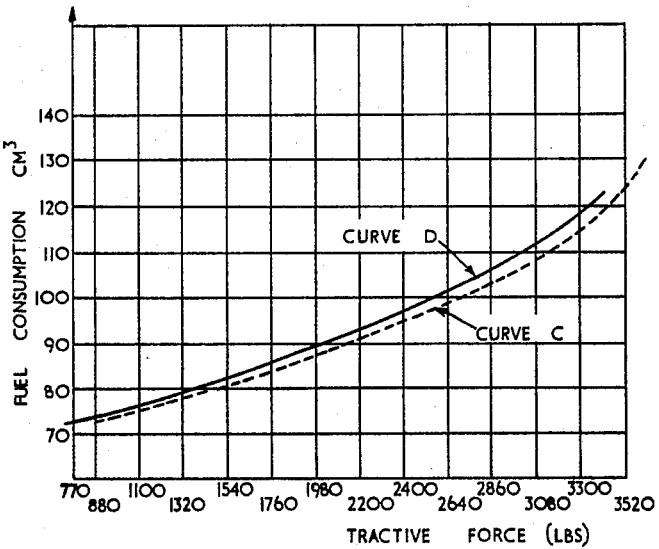

Conventional tires were then fitted to the tractor and tested in a similar way, curve D on FIGURE 6 representing the fuel consumption of the vehicle as a function of its tractive force when fitted with the conventional tires.

A comparison of curves C and D shows that with the use of the tires according to the invention, the fuel consumption of the tractor was lower for a given tractive force than when the tractor was fitted with conventional tires. In certain cases, with the use of the tires according to the invention, there was a saving of fuel within the range of 4 to 5% of the amount used when the tractor was fitted with conventional tires.

It is considered that the saving of fuel when using the tires according to the invention is caused at least partly because the tires according to the invention have a greater gripping contact area with the ground than conventional tires.

Further because, for a given compression of the crown region, the tire according to the invention requires a lower inflationary pressure than the conventional tire, there is greater comfort for the driver of the tractor with the use of tires according to the invention than with the use of conventional tires.

Figure 7A:
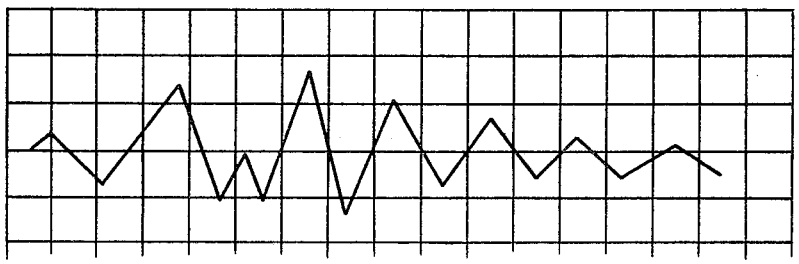
FIGURE 7a is a graphical representation of the vibrations of an accelerometer when a tractor fitted with two tires shown in the figures above is driven over an object.
Figure 7B:
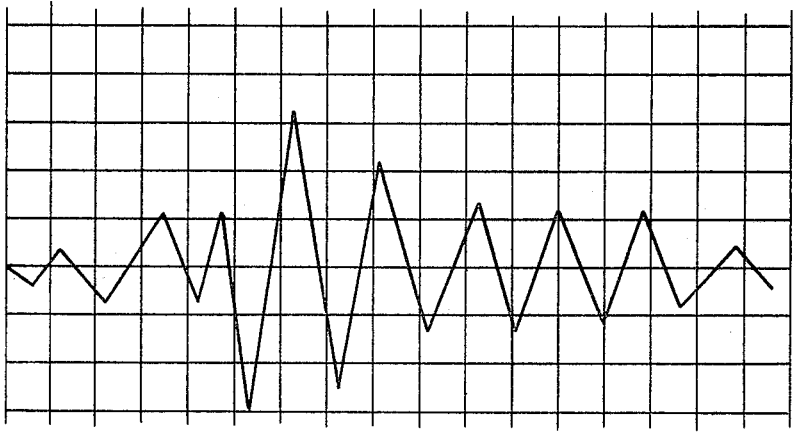
FIGURES 7b and 7c are similar representations to FIGURE 7a when the tractor is fitted with two types of conventional tractor tire.
Figure 7C:
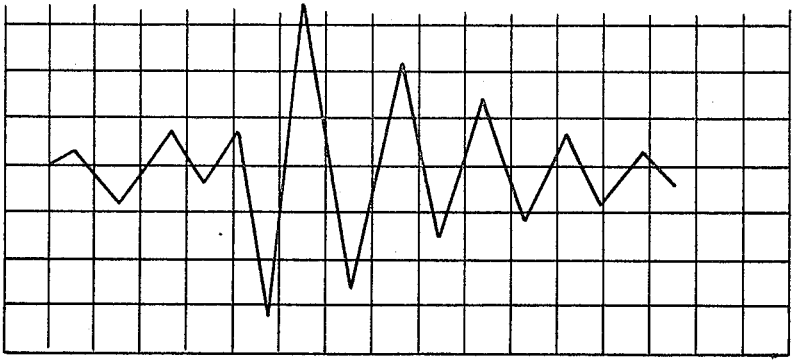

To compare the degrees of comfort for the driver of the tractor when using tires according to the invention and then when using two conventional tractor tires operating at higher normal inflationary pressures, an accelerometer was fitted to the tractor. The tractor, fitted with tires according to the invention, was then driven at a speed of 10 km./hr. over an object on the ground and the vibrations of the accelerometer were recorded. Vibrations of the accelerometer were then recorded for the passage of the tractor over the same object and at substantially the same speed when fitted with the conventional types of tractor tires. FIGURE 7a is a graph showing the amplitude of the vibrations of the accelerometer measured over a predetermined time when the vehicle was fitted with tires according to the invention. FIGURES 7b and 7c show graphs of the accelerometer vibrations with the conventional types of tire fitted to the tractor, the time and amplitude bases of the graphs being on scales which correspond to those of FIGURE 7a.

FIGURES 7a, b and c show that the amplitude and frequency of the vibrations of the accelerometer were less when the tractor was fitted with the tires according to the invention than when fitted with the conventional tires thus illustrating that a smoother ride was obtained by the driver with the use of the tires according to the invention.

A further advantage with the use of the tire according to the invention is that because the cords of the tire are located at angles below 33° to the midcircumferential plane and the tread lugs are located at angles between 45° and 55° to said plane, the cords offer a better support to the lugs of the tread and are more effective in dissipating the loads imposed upon the tread lugs around the carcass than are cords which are disposed at higher angles to said plane as in conventional tires. Furthermore, because the normal inflationary pressures of the tires according to the invention are lower than in a conventional tire, the tire is more resilient than a conventional tire and is therefore more effective in the removal of earth trapped between the lugs of the tire.

A further advantage is that because the tire according to the invention has a smaller ratio of maximum mean height to maximum mean width compared with conventional tire, the distance from bead region to bead region of the tire according to the invention is less than that for a conventional tire of similar size, so that the tire according to the invention requires less material in its manufacture and is therefore less expensive to produce than the conventional tire.

In a second embodiment, a pneumatic tire for use on a civil engineering vehicle is of construction similar to that described above except for the dimensions of the tread lugs.

In the second embodiment, the ratio of the width $W_1$ to the maximum mean width G of the carcass reinforcement lies between 1.45 and 1.75 and the ratio of the lug heights $d$ and $d_1$ to the width G lie, respectively, between 0.05 and 0.07 and between 0.065 and 0.10.

Having now described my invention what I claim is:

1. A pneumatic tire having a midcircumferential plane and incorporating a tread having a crown region and comprising a plurality of ground-contacting lugs, and a carcass reinforcement located radially within the tread and consisting of a plurality of layers of reinforcing cords between the bead regions of the tire, the cords in each of the layers extending across the crown region in a direction lying at a maximum angle of 33° to said plane, and in the molded uninflated shape of the tire, the carcass reinforcement having a maximum mean height to a maximum mean width ratio lying within range between .5 and .75.

2. A pneumatic tire according to claim 1 wherein the cords in each layer of the carcass reinforcement extend in a direction at an angle of between 27° to 33° to said plane.

3. A pneumatic tire according to claim 1 wherein the carcass reinforcement has a maximum mean height to a maximum mean width ratio lying within the range from .6 to .7.

4. A pneumatic tire according to claim 1 wherein, in a cross-section of the tire normal to said plane and in the crown region of the tire, the carcass reinforcement has a radius of curvature which is greater than the maximum mean height of the reinforcement.

5. A pneumatic tire according to claim 1 wherein each ground-contacting lug of the tread extends across the tread at an angle of between 45° and 55° to the midcircumferential plane of the tire.

6. A pneumatic tire according to claim 5 wherein a pair of shoulders are located one axially on each side of the tread and wherein each ground-contacting lug of the tread has one portion located adjacent the midcircumferential plane of the tire which extends in a direction at an angle of between 45° and 50° to said plane, and another portion which extends toward a shoulder of the tire at an angle of between 50° and 55° to said plane.

7. The pneumatic tire of claim 1 in which all of said lugs extend from approximately the midcircumferential plane of said tire to opposite side wall region of the tire at an angle of from 45° to 55° to said midcircumferential plane, alternate lugs extending to opposite side wall regions, the apices of the angles pointing in the same direction on said midcircumferential plane.

8. The pneumatic tire of claim 7 in which said lugs decrease in width from the end of the midcircumferential plane toward the side wall regions.

9. The tire of claim 7 in which said lugs have a larger angle at the part near the midcircumferential plane than at the part near the side wall regions.

10. The pneumatic tire of claim 7 in which the angle of the sides of said lugs facing the direction of travel to a radius of said tire are larger than that of the opposite side of said lug to a radius.

11. The pneumatic tire of claim 7 in which one end lies astride the midcircumferential plane of the tire and extends at an angle therefrom for a limited distance and then extends at a larger angle to the midcircumferential plane.

References Cited by the Examiner
UNITED STATES PATENTS

| | | | |
|---|---|---|---|
| 2,869,610 | 1/1959 | Lippmann et al. | 152—354 X |
| 3,074,455 | 1/1963 | Richey | 152—356 X |
| 3,115,921 | 12/1963 | Leibee | 152—361 |
| 3,164,193 | 1/1965 | Uotani et al. | 152—361 |

FOREIGN PATENTS

| | | |
|---|---|---|
| 830,133 | 3/1960 | Great Britain. |
| 1,098,386 | 1/1961 | Germany. |

ARTHUR L. LA POINT, *Examiner.*

EUGENE G. BOTZ, C. W. HAEFELE,
*Assistant Examiners.*